United States Patent Office 2,899,633
Patented Aug. 11, 1959

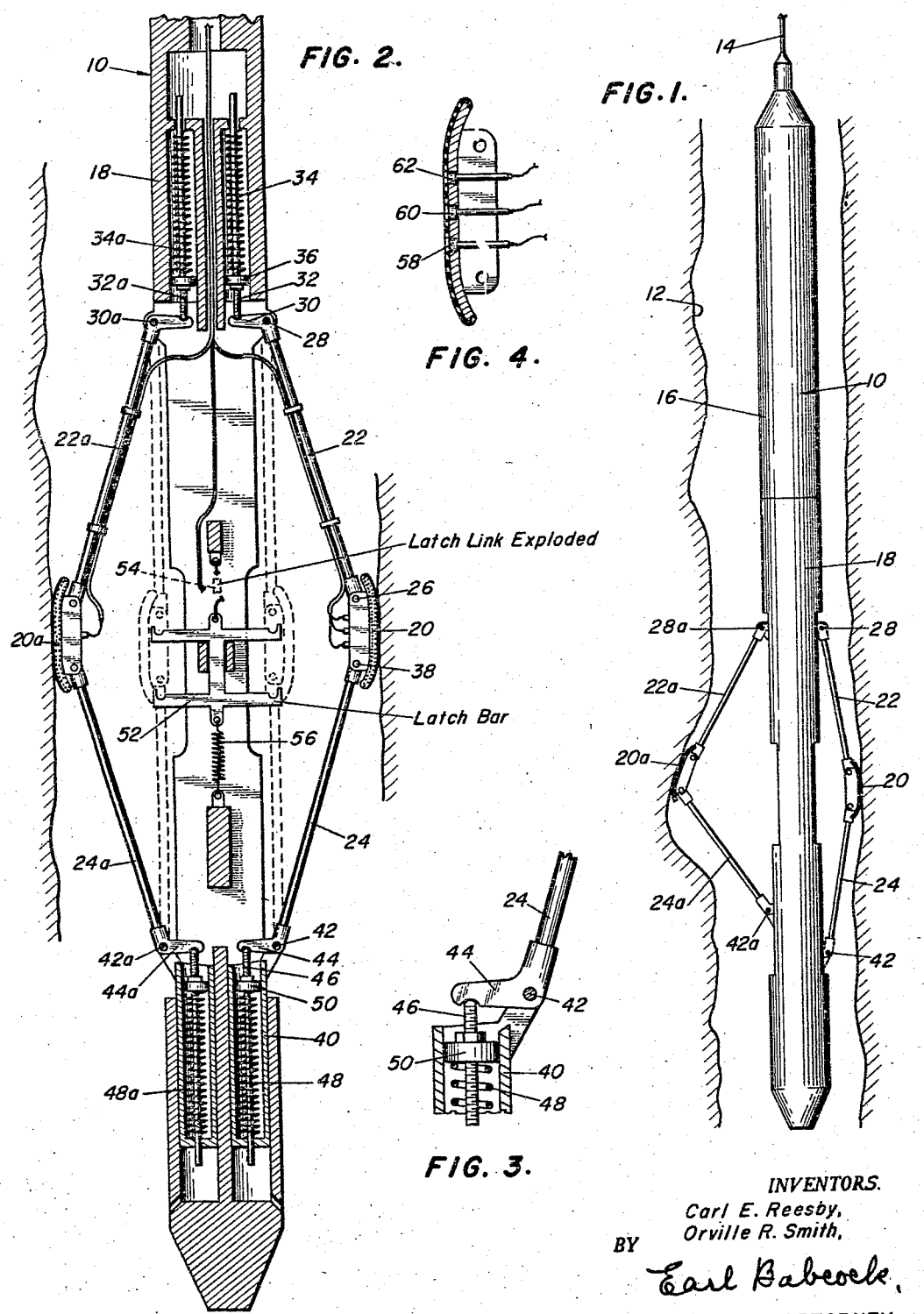

2,899,633

WELL LOGGING DEVICE

Orville R. Smith and Carl E. Reesby, Houston, Tex., assignors, by mesne assignments, to Welex, Inc., a corporation of Delaware Application April 5, 1956, Serial No. 576,397

6 Claims. (Cl. 324—10)

This invention generally relates to electrical logging methods and apparatus and more particularly to a novel apparatus for obtaining improved indications of the electrical resistivities and spontaneous potentials of earth formations traversed by a well bore.

Methods and apparatus for making highly localized electrical resistivity measurements against the wall of a well bore are presently well known and used by those skilled in this art. Though varying somewhat in individual application the methods generally employ electrodes supported on the outer face of an insulated and resilient support, commonly called a pad, which is maintained in firm contact with a well bore wall as the logging tool travels through said bore. One of such electrodes usually permits current flow into the formation to a remote return, and other potential electrodes, linearly spaced from the current electrode and one to another, measure the potential between said potential electrodes or between one such potential electrode and the current electrode.

As is known, the recorded resistivity of such measurements are generally the results of three variables. These are: the resistivity of the zone immediately back of the mud cake, the resistivity of the mud cake, and the thickness of the mud cake. In case the pad does not have firm contact with the well bore wall a fourth variable may be introduced which would be that of the mud itself. It has been generally found that such mud is of less resistivity than the filter cake of said mud and it may easily be seen that the electrodes, if not isolated from said mud, would measure the resistivity of the mud alone and not that of the filter cake and formation. Since the resistivity of the formation is ultimately desired it may well be seen that holding the remaining variables as nearly constant as possible would give optimum measurements.

Present tools generally support the described pad or pads against the well bore walls by means of bowed springs commonly joined at top and bottom in a manner permitting their expansion or contraction in response to well bore diameter. As can be readily discerned such tools must be centered in the bore hole for all of such pads to contact the bore walls. It is also evident that such pads will tend to remain parallel to the tool body at all points of expansion or contraction. When logging in a well bore having variations in bore diameter, due to the washing out of softer formations, these pads would tend to pull away from a bore wall that is not cylindrical or of constant diameter, and thus allow mud to enter between said pad and bore wall. Also, when logging in a well bore which inclines from the vertical, the weight of the tool tends to force the tool to the lower side of the well bore, and when sufficiently pronounced, can cause the pads on the upper side to lose contact with the walls of the well bore. At such times the electrodes would primarily measure only the resistivity of the mud.

It is, therefore, the general object of this invention to provide improved supportnig means for an electrode pad that will cause the pad to follow the contours of a well bore of varying diameter and provide a substantially uniform contacting force of the entire pad to the bore wall.

In accordance with this invention there is provided a device having one or more supports for logging electrode pads. The device comprises, a body, one or more of said supports connected to said body, each of said supports having an upper arm attached in pivoted relation to said body and attached in pivoted relation to one end of an electrode pad, a lower arm attached in pivoted relation to an opposed end of said pad and attached in both pivoted and reciprocating relation to said body, a first moment inducing means, in connection with said body and said upper arm to force one end of said pad outwardly from said body, and a second moment inducing means in connection with said body and said lower arm to force an opposing end of said pad outwardly from said body. The arrangement is such that said pad may be extended to a well bore wall located at varied distances from said body and at varied angles to said body and yet retain a substantially constant close and forceful contact with said bore wall.

For a better understanding of the invention reference may be had to the accompanying drawing in which:

Figure 1 is a cross sectional view of a well bore showing therein an elevational view of the apparatus of this invention.

Figure 2 is a cross sectional view taken longitudinally of the apparatus.

Figure 3 is a detailed cross sectional view particularly illustrating the crosshead sleeve elements.

Figure 4 is a detail cross sectional view of the electrode pad illustrating the positioning of the electrodes.

Referring to the drawing in detail, and first to Figure 1, a complete logging tool 10, as provided by this invention, is suspended in a well bore 12 by a cable 14. The tool 10 is generally comprised of an upper housing 16 and an elongated lower body 18. The housing 16 contains electrical amplifying and signalling apparatus with which the measurements taken at the electrodes are transmitted to the surface of the earth. The body 18 has attached thereto electrode pads 20 and 20a which are supported in resilient relation to said body by means of upper support arms 22 and 22a and lower support arms 24 and 24a.

Now referring to Figure 2, it is seen that the structures supporting pads 20 and 20a are identical. The following structural description will therefore be given with numbers to reference the support for pad 20. The corresponding structural elements for the support of pad 20a will thus bear identical numbers to those elements of pad 20 followed by the suffix a.

It is also pointed out, when unlatched as later described, that the structures supporting pads 20 and 20a may operate quite independently of one another. Such independent action deems it obvious, even though the tool 10 is herein illustrated and described having two electrode pads in combination therewith, that there may be other embodiments provided having one to several pads, limited only by dimension and the need for such pads.

The upper arm 22 is pivoted at the lower end of said arm to the upper end of pad 20 by means of a pin 26 and at the upper end of said arm to body 18 by means of a pin 28. Rigidly attached to the upper end of arm 22 at a suitable angle to the axis thereof is a lever 30. This lever 30 is adapted to contact with and be actuated by a push rod 32. Push rod 32 extends into and parallel to the axis of body 18 and is spring loaded by a spring 34, said spring being supported at one end by body 18 and the other end by a keeper 36. Keeper 36 is firmly attached to push rod 32 in such manner that said keeper may be adjustably positioned along the length thereof. It may thus be seen that the force exerted on lever 30 by the push rod 32 may be preselected by longitudinal adjustment of the keeper 36 relative to said push rod.

It is pointed out that the arm 22 may pivot through a large sector with little resulting deflection of spring 34. Since the force exerted by such a spring is usually proportional to the deflection thereof it is readily seen that a force exerted by said spring will have little change in response to movement of arm 22. Thus, the force exerted to the pad 20 at pin 26 will be relatively constant throughout a wide movement variation of pad 20 relative to body 18.

The lower arm 24 is pivoted at its upper end to the lower end of pad 20 by means of a pin 38 and pivoted at its lower end to a crosshead sleeve 40 by means of a pin 42. The lower arm 24 also has a lever 44 pivoted about pin 42 and rigidly attached to lower arm 24 at a suitable angle to the axis thereof. Lever 44 is adapted to contact with and be actuated by a push rod 46 extending through sleeve 40. A spring 48 is compressed and supported within sleeve 40 by abutting a shoulder in said sleeve at its lower end and by abutting a keeper 50 attached to push rod 46, said keeper being adjustable in the manner previously described for keeper 36. This spring 48 thus exerts a force through push rod 46 to lever 44, creating a moment about pin 42 which resolves into a force exerted to the pad 20 at pin 38.

As illustrated in Figures 2 and 3, the crosshead sleeve 40 is mounted in body 18 in a manner permitting extensive longitudinal movement of said sleeve relative to said body. Thus, as the pad 20 moves out from body 18 in response to the forces of springs 34 and 48, the sleeve 40 will move up in response to the decreased distance between pins 28 and 42.

It is now seen that pad 20 has forces exerted at both ends of said pad which firmly hold said pad in contiguous relation to the walls of a well bore even though either of said ends may independently extend or contract from body 18 in response to diameter variations of said bore.

It is also pointed out that pad 20 may be connected to arms 22 and 24 in a manner permitting said pad to pivot somewhat with respect to the plane defined by the extension of said arms from body 18. Thus, if the tool 10, as illustrated in Figure 1, were to be positioned in a well bore off the axis thereof and the plane of the extended pad supports defined a chord across said well bore which is less than the diameter thereof, said pads could then pivot about into tangental contact with the walls of said well bore.

It is seen that the body 18, the upper arm 22, the pad 20, and the lower arm 24 form a quadralateral linkage having moments induced about pins 28 and 42. Such moments create couples with respect to each of the arms 22 and 24. Since the movement of the linkage is confined as previously described the horizontal force components of such couples tend to effect movement at pins 26 and 38 and the vertical force components tend to effect movement at pins 28 and 42. Since pin 28 is fixed with respect to body 18 all of such vertical movement must occur at pin 42, and is so allowed by the longitudinal travel of sleeve 40. Thus, it is seen that the pad 20 may extend varied distances to contact the well bore wall and yet maintain a relatively constant force against said bore wall, even though one end of said pad might be extended out more than the other. As illustrated in Figure 1, the faces of pads 20 and 20a are insubstantially equal close and forceful contact with the wall of well bore 12 even though pad 20a extends out further into a washed out section and contacts a portion of said wall which is materially inclined from the axis of said bore.

When desired, a latching means, latch 52 being an example, holds the pads 20 and 20a in retracted position. As shown, the latch 52 consists of bars hooked over pins 26 and 38 to confine the pads into the position indicated in Figure 2 by dotted lines. The latch 52 is restrained in this hooked position by link 54. Link 54 may be parted when desired, as upon electrical detonation, allowing latch 54 to be drawn off pins 26 and 38 in response to a spring 56. The pads will then extend into firm contact with the walls of well bore 12.

Each pad has one or more electrodes positioned therein for taking electrical measurements. For example, there is illustrated in Figure 4 an embodiment of such a pad having a current electrode 58, a voltage electrode 60, and a voltage electrode 62. This arrangement allows current to emanate from electrode 58 and an increment of the voltage drop from said electrode to a remote return to be measured at electrodes 60 and 62. As illustrated in Figure 2 at pad 20a, the center voltage electrode 60 may be the only electrode connected and the measurement of the spontaneous potential of the well bore from this electrode to the surface can be determined.

In operation, the tool 10 is assembled as described and lowered into a well bore with the pads 20 and 20a in retracted position. The latching link 54 is then parted, allowing the pads to extend. Electrical measurements are then made of the traversed well formation as the pads 20 and 20a follow the contours of the well bore walls in response to raising the tool 10 in said well bore. It is pointed out, even though the common practice is to extend the pads at the bottom of the well bore and take measurements while coming out of said bore, that this device will work equally satisfactorily if unlatched at the surface and such measurements are taken while going into the well bore.

It is also noted, while not illustrated herein, that the upper push rods 32 and 32a move in proportion to the extension and contraction of upper arms 22 and 22a which follow the contour of the well diameter. It is foreseen, therefore, that these rods could be linked to series connected electrical resistors or equivalent devices and the diameter of the well bore also be measured as the tool 10 traverses the well bore 12.

It is to be understood that this invention is not limited to the illustrative embodiment herein described in detail, but includes such modifications thereof as fall within the scope of the appended claims.

That which is claimed is:

1. In an electrical logging device for measuring electrical characteristics of a local section of a well bore wall, the combination of a conductor cable, a housing connected to said cable, said housing containing means to transmit measurements taken to the surface of the earth, a body attached to said housing, at least one measuring electrode mounted in an electrode pad being supported contiguous to a well bore wall from said body by a support means, said support means comprizing, an upper arm pivotally connected to said body and pivotally connected to a first end of said electrode pad, a first moment inducing means between said body and said upper arm to cause angular extension of said upper arm from said body, a lower arm pivotally connected to a second and opposite end of said electrode pad and pivotally connected to a crosshead means, said crosshead means being connected to said body whereby only longitudinal movement is permitted between said crosshead means and said body, and a second moment inducing means between said crosshead means and said lower arm to cause angular extension of said arm from said crosshead.

2. In an electrical logging device, the combination of a body, support means from said body to support measuring electrodes mounted in electrode pads against a well bore wall, each of said support means comprizing, an upper arm pivotally connected to said body and pivotally connected to a first end of an electrode pad, a first moment inducing means between said body and said upper arm to cause angular extension of said upper arm from said body, a lower arm pivotally connected to a second end of said electrode pad and pivotally connected to a crosshead means, said crosshead means being connected to said body whereby only longitudinal movement is permitted between said crosshead means and said body, and a second moment inducing means between said crosshead means and said lower arm to cause angular extension of said arm from said crosshead.

3. In an electrical logging device for measuring electrical characteristics of a local section of a well bore wall, the combination of a conductor cable, a body connected to said cable, measuring electrodes mounted in electrode pads being individually supported contiguous to a well bore wall from said body by support means, each of said support means comprising, an upper arm pivotally connected to said body and pivotally connected to a first end of an electrode pad, a first moment inducing means between said body and said upper arm to cause angular extension of said upper arm from said body, a lower arm pivotally connected to a second end of said electrode pad and pivotally connected to a crosshead means, said crosshead means being connected to said body whereby only longitudinal movement is permitted between said crosshead means and said body, a second moment inducing means between said crosshead means and said lower arm to cause angular extension of said arm from said crosshead, and means connected to the upper arms of said support means to measure the angular extension of said upper arms whereby the diameter of the well bore may be determined.

4. A support for logging electrode pads comprizing, an upper arm pivotally connected to an elongated body and pivotally connected to a first end of an electrode pad, a first moment inducing means to angularly extend said upper arm from said body, a lower arm pivotally connected to a second end of said electrode pad and both pivotally and reciprocatively connected to said body, and a second moment inducing means to angularly extend said lower arm from said body.

5. In combination with an electrical logging device, an elongated body having at least one electrode support, said support comprizing, at least one electrode mounted in an electrode pad, an upper arm attached in pivoted relation to a first end of said electrode pad and attached in pivoted relation to said body, a first moment inducing means between said upper arm and said body to angularly extend said arm from said body, a lower arm attached in pivoted relation to a second end of said electrode pad and attached in both a pivoted and longitudinally reciprocating relation to said body, and a second moment inducing means between said lower arm and said body to angularly extend said arm from said body.

6. A support for logging electrode pads, comprizing, an elongated body having mounted thereto a crosshead adapted to move longitudinally in relation to said body, a first arm pivotally connected to said crosshead and pivotally connected to a first end of an electrode pad, a first moment inducing means between said crosshead and said first arm to angularly extend said first arm from said body, a second arm pivotally connected to a second end of said electrode pad and pivotally connected to said body, and a second moment inducing means between said second arm and said body to angularly extend said second arm from said body.

References Cited in the file of this patent

UNITED STATES PATENTS

| | | |
|---|---|---|
| 1,708,354 | Cabot | Apr. 9, 1929 |
| 2,267,110 | Kinley | Dec. 23, 1941 |
| 2,680,913 | Johnston | June 15, 1954 |
| 2,732,525 | Blanchard | Jan. 24, 1956 |
| 2,812,587 | Roussin | Nov. 12, 1957 |